United States Patent [19]
Rogut

[11] Patent Number: 5,882,461
[45] Date of Patent: Mar. 16, 1999

[54] CONCENTRIC RADIAL FLOW HOLLOW FIBER MODULE AND METHOD OF MANUFACTURE

[75] Inventor: Jan Rogut, Cincinnati, Ohio

[73] Assignee: Integrated Process Technologies, Jackson Hole, Wyo.

[21] Appl. No.: 706,404

[22] Filed: Aug. 29, 1996

Related U.S. Application Data

[60] Provisional application No. 60/013,397, Mar. 14, 1996.

[51] Int. Cl.$^6$ ................................................ B32B 31/00
[52] U.S. Cl. ...................... 156/182; 156/229; 156/267; 156/296; 210/321.8; 165/164
[58] Field of Search .................... 210/321.8; 165/164; 156/182, 229, 267, 296, 87

[56] References Cited

U.S. PATENT DOCUMENTS

| | | | |
|---|---|---|---|
| 5,284,583 | 2/1994 | Rogut | 210/321.8 |
| 5,328,610 | 7/1994 | Rogut | 210/321.8 |
| 5,332,498 | 7/1994 | Rogut | 210/321.8 |
| 5,695,702 | 12/1997 | Niermeyer | 156/296 X |

OTHER PUBLICATIONS

Serndip—PVDF Shell and Tube Heat Exchangers.
Fabrication of Hollow Fibre Gas Separation Membranes, Mar., 1990.
Compact, Heat Exchangers=A Review of Current Equipment and R & D in the Field, 1994.

*Primary Examiner*—James Engel
*Attorney, Agent, or Firm*—Flanagan & Flanagan; John R. Flanagan; John K. Flanagan

[57] ABSTRACT

A concentric radial flow hollow fiber module includes internal and external annular-shaped spaced apart bodies disposed in a concentric arrangement and hollow fibers extending across an annular interspace extending through the module between the bodies and connected with the bodies. The internal body surrounds an inner space while the external body is surrounded by an outer space. Each body includes an annular wall made of a non-permeable plastic material having adhesive properties and an elongated strengthening element contained within and extending circumferentially about the annular wall. Each hollow fiber includes an tubular wall having spaced opposite inner and outer end portions encapsulated respectively in the internal and external bodies and open respectively to at least one of the inner and outer spaces. Each hollow fiber also includes an elongated main portion interconnecting the opposite ends portions and extending across the interspace and defining an elongated internal bore providing flow communication with at least one of the inner and outer spaces of the module. A method of manufacturing the module includes laying out hollow fibers forming a pair of strips of non-permeable adhesive material on the hollow fibers in a transverse relationship thereto and in a spaced relationship from one another, and lengthening one strip relative to the other strip to thereby transform the strips into spaced inner and outer strips defined in a concentric relationship surrounding a longitudinal axis and interconnected by the hollow fibers extending across the interspace between the inner and outer strips.

11 Claims, 6 Drawing Sheets

CONCENTRIC RADIAL FLOW HOLLOW FIBER MODULE AND METHOD OF MANUFACTURE

This application claims benefit of provisional application Ser. No. 60/013,397 filed Mar. 14, 1996.

TECHNICAL FIELD

The present invention generally relates to devices for mass transfer and heat exchange applications and, more particularly, is concerned with a concentric radial flow hollow fiber module having a pair of concentric internal and external bodies and a plurality of radial flow hollow fibers and with a method of manufacture.

BACKGROUND ART

There exists a considerable number of chemical, biotechnological and industrial processes whose. efficiencies are dependent upon and controlled by the rates of heat exchange between flowing streams of fluids separated by impermeable barriers capable of high heat conductivity. A significant number of these processes require heat transfer between different mediums being in the same or different phases, gas-gas gas-liquid or liquid-liquid phases.

In most conventional heat exchange devices, the basic heat transfer elements, being the impermeable barriers with high heat conductivity, are built from metals or metal alloys. Conventional heat exchange devices employ basic heat transfer elements of differing geometries and flow arrangements. A survey of heat exchange devices in compact systems is found in an article by D. A. Reay entitled "Compact Heat Exchangers: A Review of Current Equipment And R & D In The Field", appearing in *Heat Recovery Systems & CHP*, Vol. 14, No. 5 pp. 459–474, 1994, Elsevier Science Ltd.

The advantages of heat transfer elements constructed of metals resides in their high heat conductivities and in their capabilities of working at high temperatures. The disadvantages of heat transfer elements constructed of metals lies in their high corrosivities and, due to their considerable densities, in the substantial weight of the resulting heat exchange devices.

However, there exists a broad group of applications where heat energy transfer is carried out at relatively low temperatures, such as not higher than 100° C., or where direct contact of the media exchanging the heat energy with the metallic surfaces is not acceptable. Health treatment systems, biotechnology processes and food processing are important examples. These applications remain in critical need for efficient new constructions of heat energy transfer devices capable of working under low levels of driving forces, meaning, low values of temperature differences between heated and cooled media.

Recently, new developments are in great demand in environmental protection applications as well as in sea water desalination applications to make commercially availabile heat exchange devices which exhibit improved performance, higher production, lower cost of fabrication and operation, and improved corrosion resistance. Also, new designs of heat exchange devices are becoming important as components in systems utilizing membrane separation technologies, such as air separation, pervaporation, etc.

Several recent developments demonstrate that in applications where the thermal energy must be transferred between gas and liquid phases, heat exchange devices that are built from certain plastic materials have exceeded heat transfer efficiencies of heat exchange devices manufactured from metal materials. These developments have been reviewed in a recent paper entitled "Kunstoffe im Warmeaustauscherbau" by Gros, published in *Kunststoffe*, 84 (1994) 6, 767–771. The results presented by Gros have relatively simple physical explanation if one takes into account the fact that the performance of heat exchange devices is the result of a chain of elementary basic heat transport mechanisms taking place in flowing fluids and in separating them by an impermeable heat conductive barrier. In this chain of elementary mechanisms, the heat conductivity of the barrier that separates the energy exchanging media is only one of several influencing the total efficiency of the overall process. In addition to the heat conductivity of the barrier, the total energy transfer depends also on the rates of energy transport inside the bulk flowing fluids as well as the rate of heat flow through the fluid-solid boundaries. These elementary mechanisms combine or add together in such way that the resistances to energy flow of each individual step are in a series arrangement. Under some conditions, the overall efficiency of energy transfer in a heat exchange device can be controlled by the performance of the step with higher resistance to the heat transfer.

There exist a number of heat exchange processes where the high heat conductivity potential of metals used as construction materials in fabricating the heat exchangers are utilized to only a minor degree. It has been shown, for example, by Gros in the paper cited above, that in some constructions of gas-liquid heat exchange devices built from plastic materials, the overall heat transfer efficiencies are comparable with those of heat exchange devices constructed from metals. Heat exchange devices built from plastic materials are especially well suited in applications at ambient temperatures. As stated by Gros, plastic heat exchange devices can be of substantial advantage when applied, for example, in temperature control of flue gases in large scale flue gas cleaning systems. Other advantages follow from the better processability of thermoplastics in manufacturing in comparison with metals. A company named Serendip B.V., located in Arnnen, The Netherlands, has recently introduced plastic heat exchangers having a bundle of small diameter thin wall tubes housed in parallel relation in an outer tube. The Serendip (trademark) plastic heat exchangers are primarily for use to cool or heat corrosive liquids and to condense corrosive vapours.

While potential benefits to be gained from the use of plastic materials in the construction of heat exchange devices have been set forth by Gros, a need still exists for innovations in the design and construction of thermoplastic heat exchange devices which will provide benefits that greatly exceed those provided by metal heat exchange devices as well as recent plastic heat exhange devices and thereby overcome the considerable conventional resistance to their adoption.

DISCLOSURE OF INVENTION

The present invention provides a concentric radial flow hollow fiber module and a method of manufacture of the module. Underlying the present invention is the recognition by the inventor herein that the overall construction of the concentric radial flow hollow fiber compact modules and their methods of manufacture can be the same regardless of whether the hollow fibers of the modules have tubular walls made of permeable materials with properties for facilitating mass separation and transfer fluids or made of impermeable material with properties for facilitating in exchange of heat energy between fluids.

Accordingly, the present invention is directed to a concentric radial flow hollow fiber module which comprises: (a) a pair of annular-shaped spaced apart internal and external bodies made of non-permeable material, the annular-shaped external body being larger in cross-section than and placed around the annular-shaped inner body, the internal and external bodies being spaced apart from one another and disposed in a concentric arrangement about a central longitudinal axis of the module so as to form therebetween an annular-shaped interspace extending through the module; and (b) a multiplicity of hollow fibers extending across the interspace of the module between and connected with the internal and external bodies. The internal body surrounds an inner space through the module along and about the longitudinal axis while the external body is surrounded by an outer space.

More particularly, each of the internal and external bodies includes an annular wall made of a non-permeable plastic material having adhesive properties and an elongated strengthening element contained in the annular wall and extending circumferentially about and within the annular wall. The strengthening element is preferably an elongated thread of inelastic material encapsulated in the annular wall of each body and interwoven between respective ones of the hollow fibers. In a first embodiment, the annular wall is formed by an elongated strip helically wound about the longitudinal axis and having successive windings seated on and attached to one another and encircling the longitudinal axis. The strengthening element extends longitudinally through the elongated strip. In a second embodiment, the annular wall is formed by a plurality of rings seated upon and attached to one another and encircling the longitudinal axis of the module. The strengthening element extends longitudinally through each ring.

The multiplicity of hollow fibers can be provided in various arrangements. In one arrangement, the hollow fibers are provided in bunches in which the individual hollow fibers are disposed in generally side-by-side relationship to one another and in which the bunches of hollow fibers are disposed in generally side-by-side relationship to one another. In another arrangement, the individual hollow fibers or bunches of hollow fibers are disposed in a plurality of spaced apart groups so as to define empty spaces therebetween. In still another arrangement, the hollow fibers are provided in a woven, non-woven or knitted textile form in which individual or bunches of hollow fibers overlap and interloop with one another as they extend between the inner and outer bodies across the annular interspace therebetween.

Each hollow fiber has a tubular wall with a pair of spaced opposite inner and outer end portions being encapsulated respectively in the internal and external bodies and open to at least one or both of the inner space inside the internal body and the outer space outside the external body. The tubular wall of each hollow fiber also has an elongated main portion interconnecting the opposite ends portions thereof and extending across and through the interspace between the internal and external bodies. The main portion of the respective hollow fiber may take a relatively straight path or a circuitous one across the annular interspace depending upon the particular arrangement of the hollow fibers. The main portion of the hollow fiber has an internal bore providing flow communication between the opposite inner and outer end portions and thus to at least one or both of the inner and outer spaces.

For mass separation and transfer applications of the module, the tubular wall of each hollow fiber can be made of a desired permeable material having desired properties. For heat energy exchange applications, the tubular wall of each hollow fiber can be made of a desired impermeable barrier material. Although with both applications, the material is preferably an appropriate highly crystallic thermoplastic polymer.

Also, the present invention is directed to a method of manufacturing of a concentric radial flow hollow fiber module which comprises the steps of: (a) laying out a multiplicity of hollow fibers; (b) forming a pair of strips of non-permeable adhesive material across the hollow fibers in a spaced relationship from one another so as to encapsulate selected adjacent portions of the hollow fibers and such that the hollow fibers extend at least between the spaced pair of strips; (c) lengthening at least one of the strips relative to the other to thereby transform the strips into a pair of spaced inner and outer strips capable of surrounding a central longitudinal axis in a concentric relationship to one another with the hollow fibers extending between and interconnecting the inner and outer strips; (d) cutting selected portions of the hollow fibers at the spaced inner and outer strips so as to open the hollow fibers to communication with at least one of the outside of the outer strip and of the inside of the inner strip; and (e) assembling a module from the spaced inner and outer strips with the hollow fibers extending between and interconnecting the inner and outer strips.

In forming the pair of strips of non-permeable adhesive material, one strip is provided with a greater thickness than the other strip. Lengthening of at least the one strip includes reducing the thickness of the one strip to cause the elongation thereof relative to the other strip.

The multiplicity of hollow fibers can be laid out in various arrangements. In one arrangement, the hollow fibers are laid out in bunches in which the individual hollow fibers are disposed in generally side-by-side relationship to one another and in which the bunches of hollow fibers are also disposed in generally side-by-side relationship to one another. In another arrangement, the individual hollow fibers or bunches of hollow fibers are laid out in a plurality of spaced apart groups so as to define empty spaces therebetween. In still another arrangement, the hollow fibers are laid out in a textile form in which individual or bunches of hollow fibers overlap and interloop with one another as they extend between the inner and outer strips.

The method of manufacture further comprises applying a pair of elongated strengthening elements across the selected adjacent portions of the hollow fibers in a transverse relationship thereto and in a spaced relationship from one another prior to forming the pair of strips of non-permeable adhesive material to thereby encapsulate the strengthening elements with the selected adjacent portions of the hollow fibers. Also, the elongated strengthening elements are preferably applied across the selected adjacent portions of the hollow fibers by interweaving the strengthening elements between bunches of the hollow fibers.

The method of manufacture still further comprises profiling the pair of strips by forming complementary interfitting features on opposite sides thereof so that corresponding ones of the strips can be attached to itself in forming the concentric radial flow hollow fiber module.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

BEST MODE FOR CARRYING OUT THE INVENTION

Referring to the drawings, and particularly to FIGS. 1 to 4, there is illustrated a concentric radial flow hollow fiber module, generally designated 10, having a construction in accordance with the principles of the present invention and manufactured in accordance with the method of the present invention. As mentioned earlier, the overall construction of the module 10 can be the same regardless of whether it is provided with properties for use in mass separation and transfer of fluids or provided with properties for use in exchange of heat energy between fluids.

Figure 1:
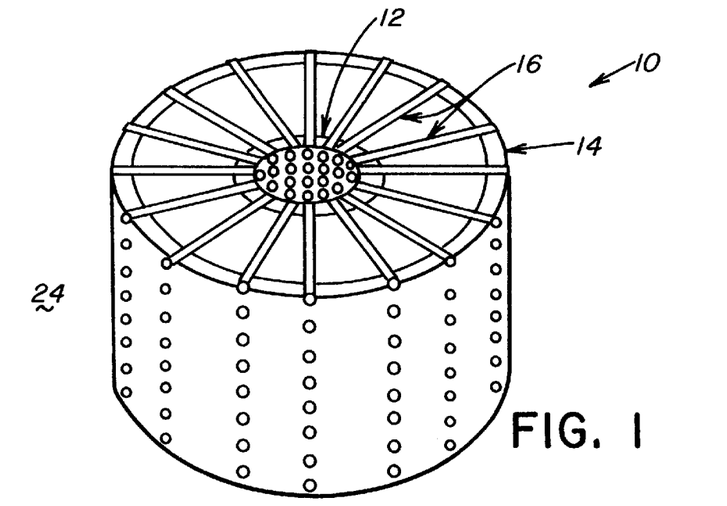
FIG. 1 is a diagrammatic perspective view of a concentric radial flow hollow fiber module of the present invention.

Basically, the concentric radial flow hollow fiber module 10 includes a pair of annular-shaped internal and external bodies 12, 14 and a multiplicity of relatively short hollow fibers 16. The external body 14 is larger in cross-sectional size than, and is placed around, the internal body 11 such that the internal and external bodies 12, 14 are spaced apart from one another and disposed in a concentric arrangement about a central longitudinal axis 18 of the module 10 so as to form therebetween an annular-shaped interspace 20 extending through the module 10. The hollow fibers 16 extend across the annular interspace 20 of the module 10 between the internal and external bodies 12, 14 and are connected with the bodies. Also, the internal body 12 surrounds an inner space 22 extending through the module 10 along and about the central longitudinal axis 18 while the external body 14 is surrounded by an outer space 24 extending about the module 10.

Each of the internal and external bodies 12, 14 includes an annular wall 26, 28 made of a non-permeable material, such as a suitable glue, having desired adhesive properties and strength for supporting the hollow fibers 16. Also, each body 12, 14 includes an elongated strengthening element 30, 32 (see FIG. 14) contained within the annular wall 26, 28 and extending circumferentially therebout. The strengthening element 30, 32 is preferably one or more elongated threads 34 (see FIG. 13) of inelastic material encapsulated in the annular wall 26, 28 and interwoven between respective groups of the ends of the hollow fibers 16 encapsulated in the annular wall 26, 28.

Figure 1A:
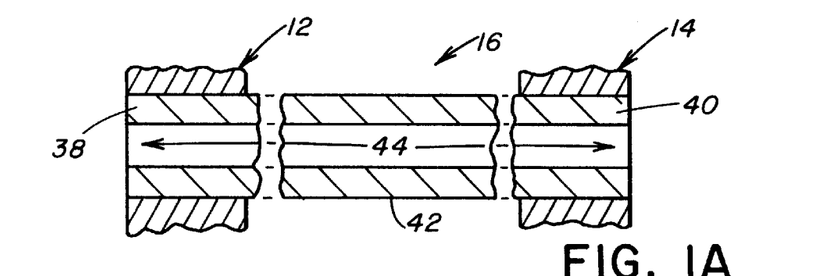
FIG. 1A is an enlarged foreshortened longitudinal sectional view of one of the hollow fibers of the module.
Figure 2:
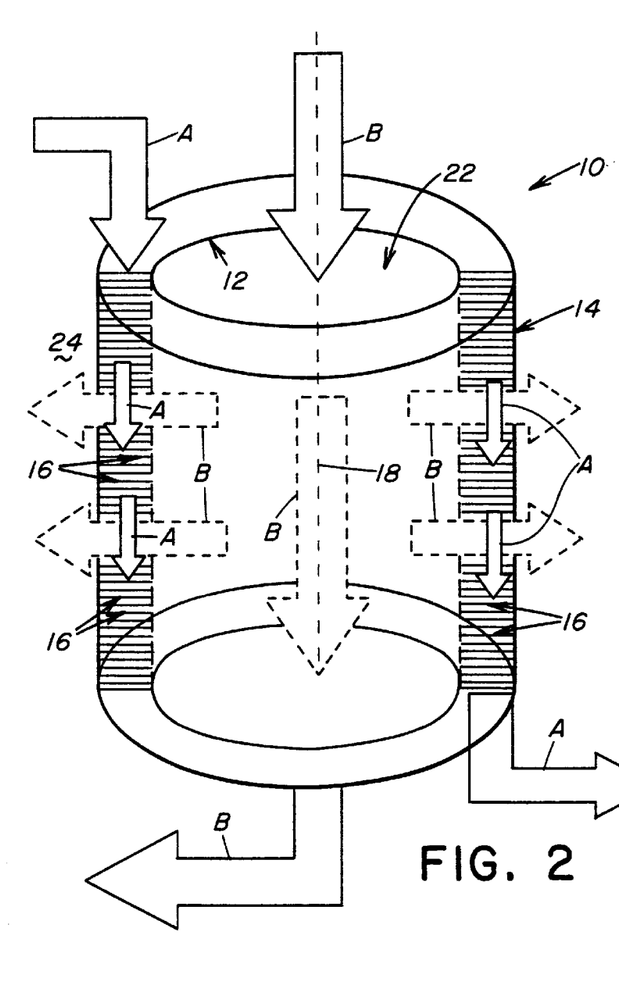
FIG. 2 is a diagrammatic perspective view of one form of the module of the present invention having a flow-through construction.
Figure 3:
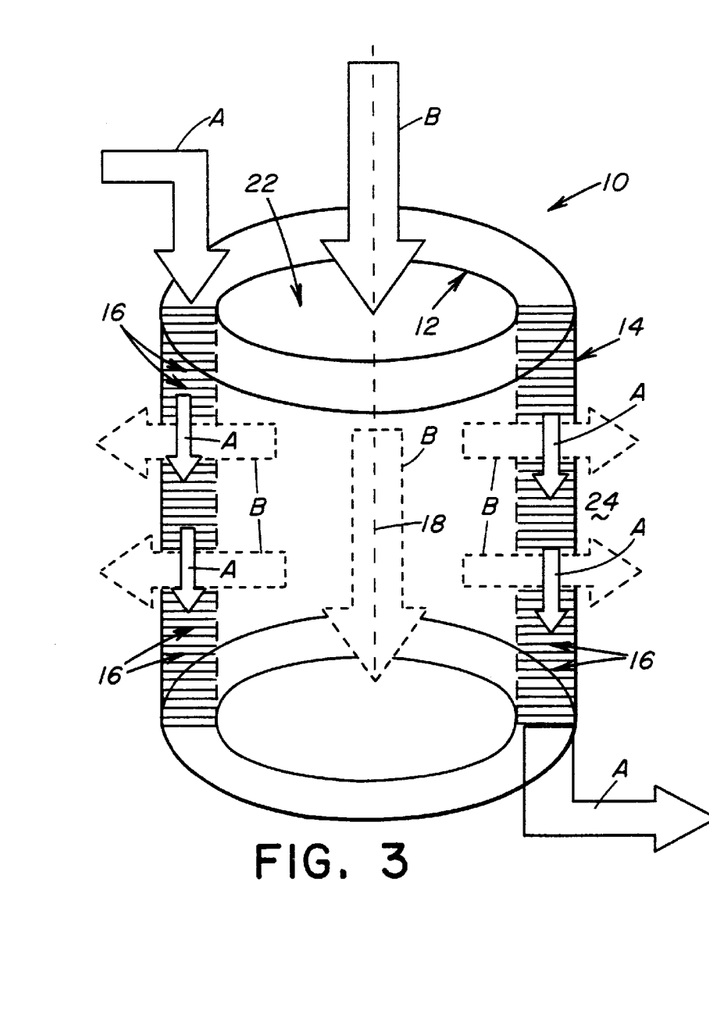
FIG. 3 is a diagrammatic perspective view of the another form of the module of the present invention having a dead-end construction.
Figure 4:
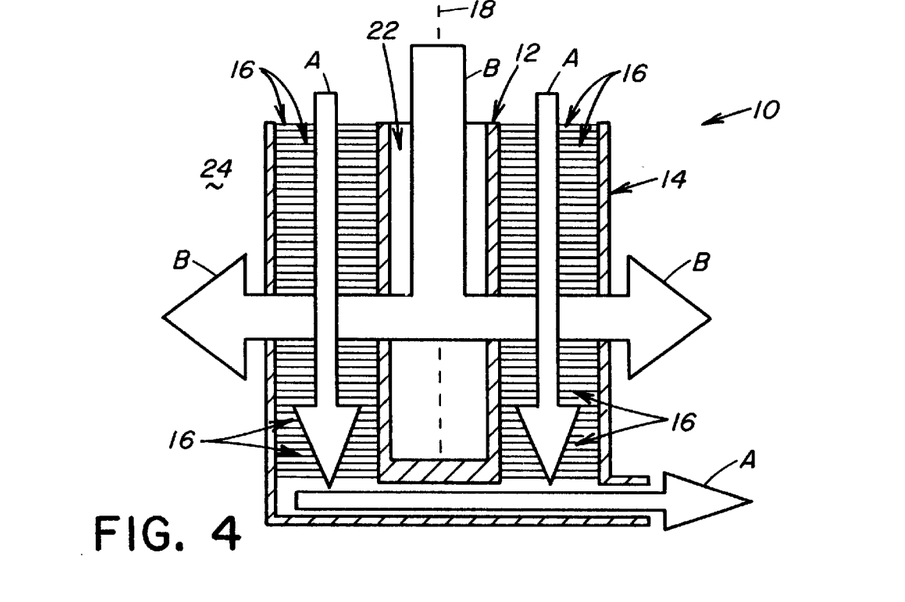
FIG. 4 is a diagrammatic longitudinal sectional view of the module of FIG. 3.
Figure 11A:
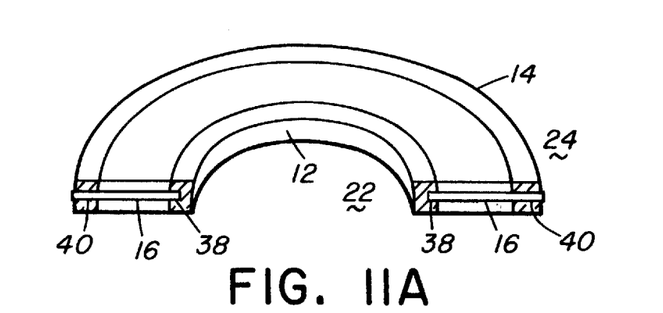
FIG. 11A is an enlarged fragmentary perspective view of the module of FIG. 10 having the outer end portions of the hollow fibers opened to the outer space about the module and the inner end portions of the hollow fibers closed to the inner space through the center of the module.
Figure 11B:
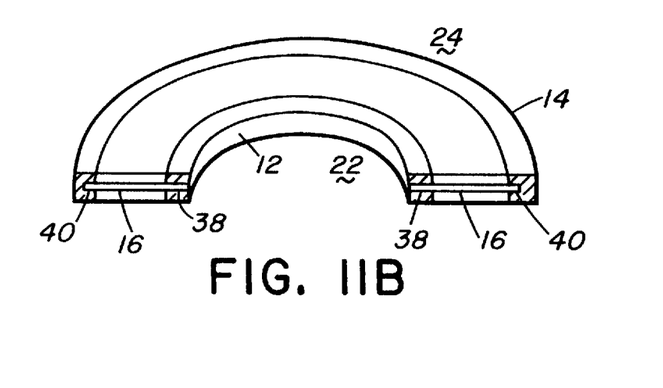
FIG. 11B is an enlarged fragmentary perspective view of the module of FIG. 10 having outer end portions of the hollow fibers closed to the outer space around the module and the inner end portions of the hollow fibers opened to the inner space through the center of the module.

Referring to FIGS. 1 and 1A, each hollow fiber 16 includes an elongated tubular wall 36 having a pair of spaced opposite inner and outer end portions 38, 40 which are encapsulated respectively in the annular walls 26, 28 of the internal and external bodies 12, 14 and open at least at one or both of the inner space 22 inside the internal body 12 and of the outer space 24 outside the external body 14. The tubular wall 36 of each hollow fiber 16 also has an elongated main portion 42 interconnecting the opposite ends portions 38, 40 and extending across and through the annular interspace 20 of the module 10 between the annular walls 26, 28 of the internal and external bodies 12, 14. The main portion 42 of the tubular wall 36 defines an elongated internal lumen or bore 44 providing flow communication between the opposite inner and outer end portions 38, 40 and thereby flow communication with at least one or the other of the inner and outer spaces 22, 24 of the module 10, as shown in FIGS. 11A and 11B, or with both of the inner and outer spaces 22, 24 of the module 10, as shown in FIGS. 1 to 4. The arrows A in FIGS. 2 to 4 depict flow paths of fluids through the annular interspace 20 of the module 10 and outside of the hollow fibers 16 whereas arrows B depict flow paths of fluids from the inner space 22 through the bores 44 of the hollow fibers 16 to the outer space 24. It should be apparent that these same flow paths are employed when the module 10 is used both in mass transfer and heat exchange applications. The arrows C, D, E in FIGS. 11A and 11B depict flow paths of fluids through the bores 44 of the hollow fibers 16 and through a selective reagent in the annular interspace 20 in a fluid separation and mass transfer application.

Figure 5:
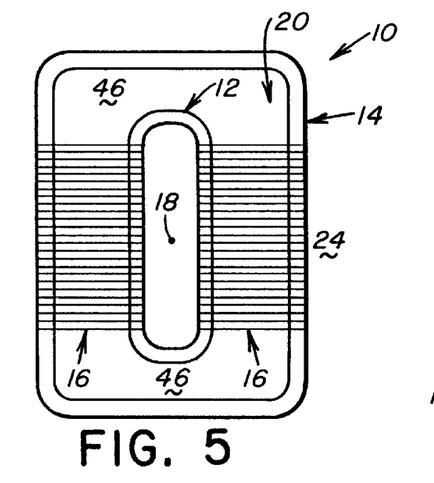
FIG. 5 is a schematic plan view of a first configuration of the inner and outer bodies and hollow fibers of the module.
Figure 6:
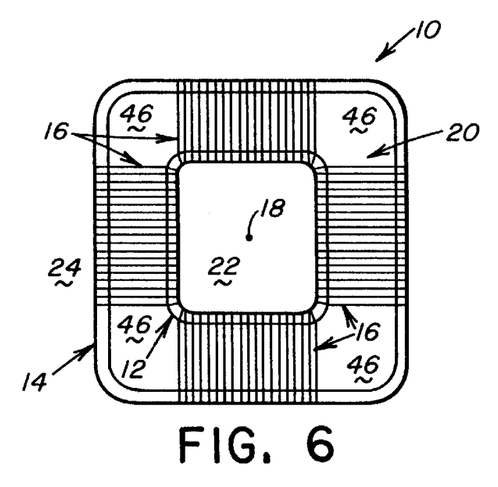
FIG. 6 is a schematic plan view of a second configuration of the inner and outer bodies and hollow fibers of the module.
Figures 7, 8, 9:
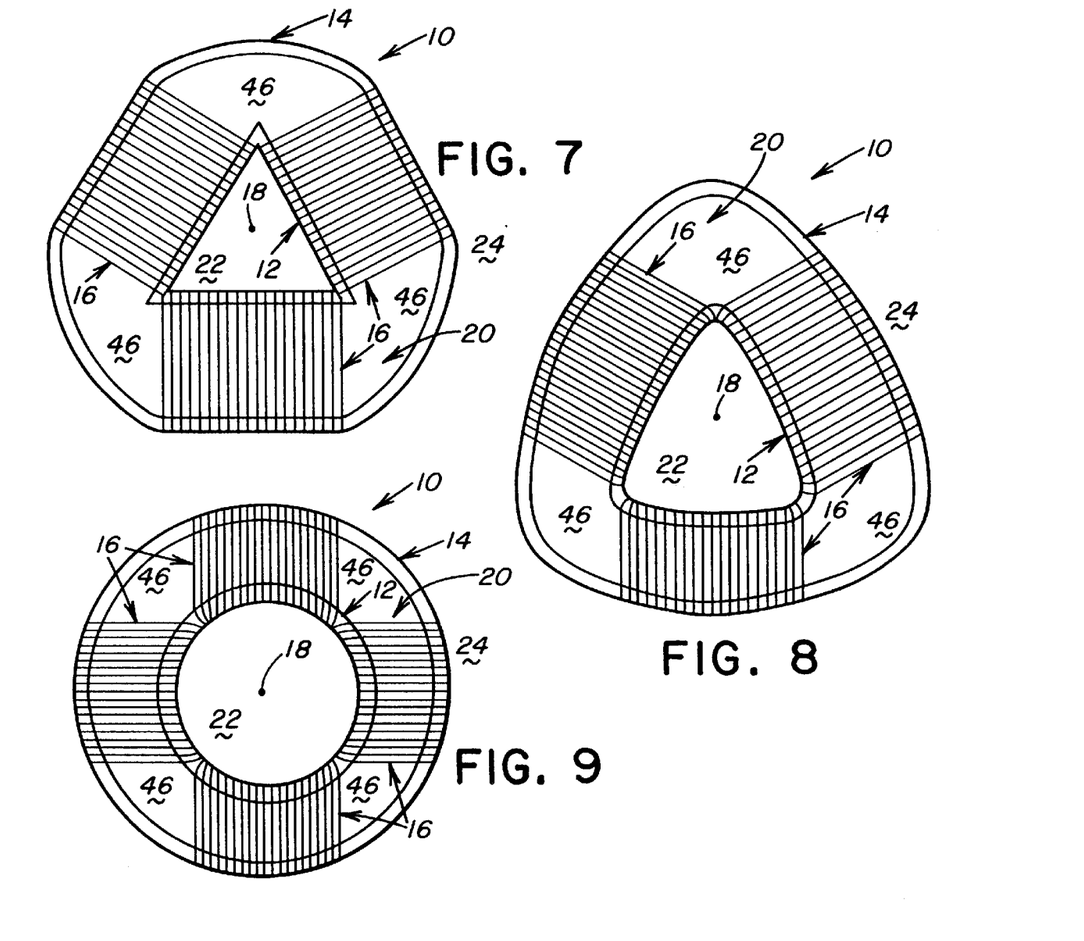
FIG. 7 is a schematic plan view of a third configuration of the inner and outer bodies and hollow fibers of the module.
FIG. 8 is a schematic plan view of a fourth configuration of the inner and outer bodies and hollow fibers of the module.
FIG. 9 is a schematic plan view of a fifth configuration of the inner and outer bodies and hollow fibers of the module.
Figure 10:
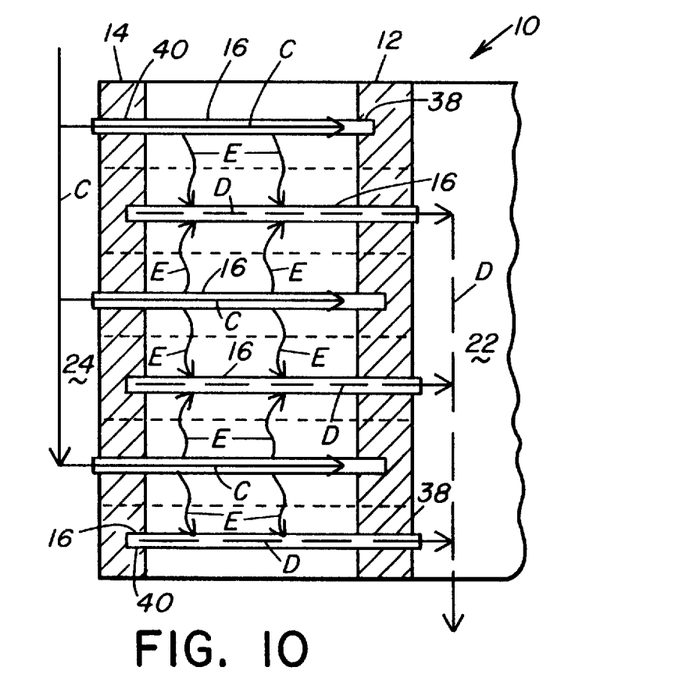
FIG. 10 is a fragmentary diagrammatic longitudinal sectional view of still another form of the module of the present invention.

Referring to FIGS. 1 and 5 to 9, there is shown some of the different possible configurations of the inner and outer bodies 12, 14 and the multiplicity of hollow fibers 16 of the module 10. FIG. 1 depicts a module 10 with the inner and outer spaced bodies 12, 14 provided in cylindrical form and the hollow fibers 16 radially extending between the inner and outer bodies 12, 14 in generally side-by-side relationship with one another. FIGS. 5 and 6 depict modules 10 with the inner and outer spaced bodies 12, 14 provided respectively in rectangular and square forms and the hollow fibers 16 provided in side-by-side relationship respectively in two and four groups spaced apart from one another so as to define empty spaces 46 therebetween. FIGS. 7 and 8 depict modules 10 with the inner and outer spaced bodies 12, 14 provided in triangular form and the hollow fibers 16 provided in side-by-side relationship in three groups spaced apart from one another so as to define empty spaces 46 therebetween. FIG. 9 depicts a module 10 with the inner and outer spaced bodies 12, 14 provided in circular form and the hollow fibers 16 provided in side-by-side relationship in four groups spaced apart from one another so as to define empty spaces 46 therebetween. The empty spaces 46 can be employed as communication channels in the module 10. The straight lines shown in FIGS. 5 to 9 can represent individual hollow fibers 16 but more likely represent bunches of hollow fibers 16.

Figure 13:
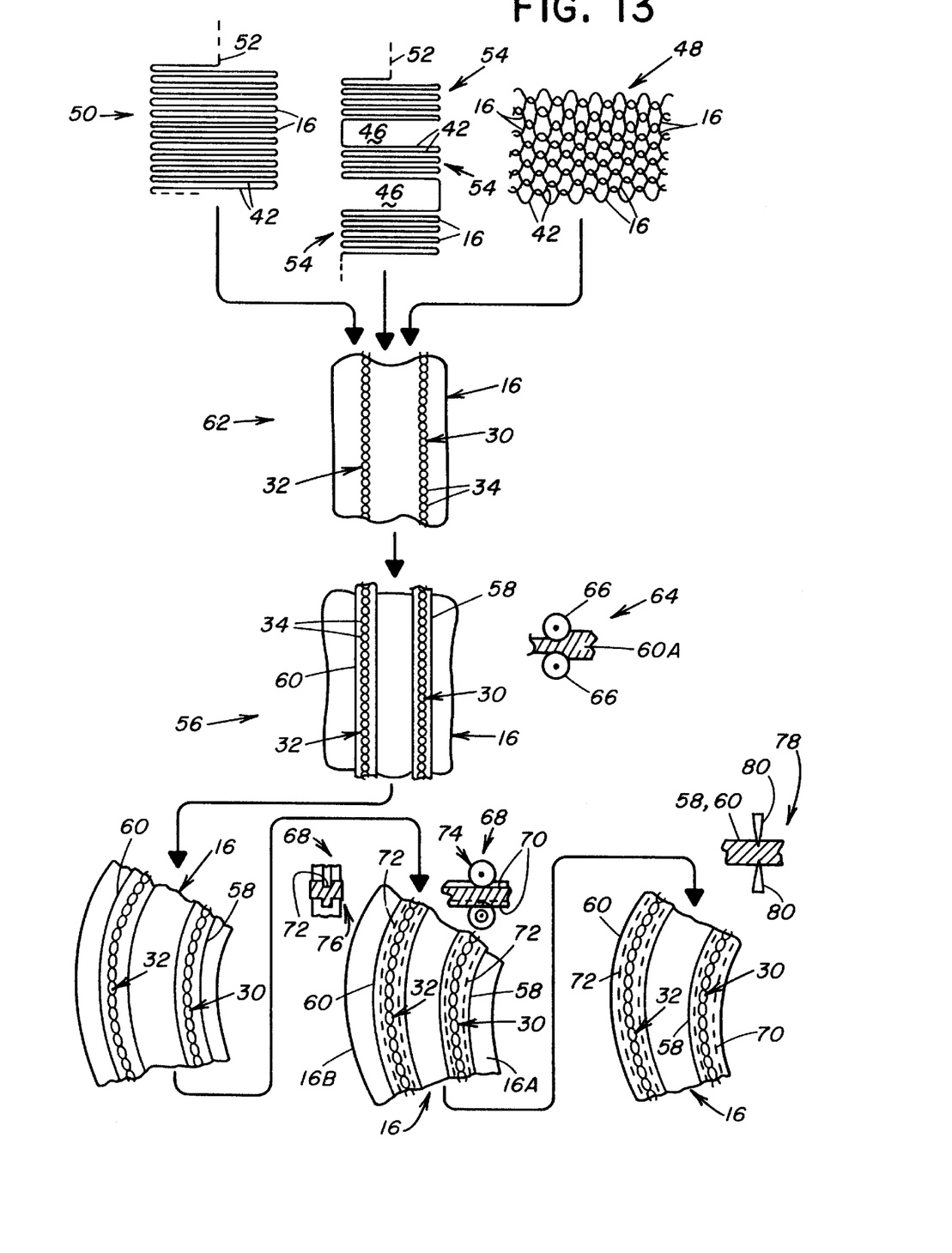
FIG. 13 is a diagrammatic representation of the steps of the method of manufacturing the module.

Alternatively, the multiplicity of hollow fibers 16 can be provided in a textile form 48, as seen in FIG. 13, in which hollow fibers 16 overlap and interloop with one another as they extend between the inner and outer spaced bodies 12, 14 across the annular interspace 20 therebetween. The textile form 48 of the hollow fibers 16 maximizes the actual surface contact area of the hollow fibers 16 due to the enhanced uniformity and regularity of the distribution of the hollow fibers 16 across the annular interspace 20 of the module 10.

As mentioned earlier, the overall construction of the module 10 which has been described above can be the same regardless of whether respective hollow fibers 16 of the module 10 are made of materials enabling use of the module 10 for mass separation and transfer of fluids or are made of materials enabling use of the module 10 for exchange of heat energy. For the mass separation and transfer of fluids, the tubular wall 36 of each hollow fiber 16 is made of a permeable plastic material having the predetermined properties adapting the module 10 for use in such applications. For example, the wall 36 can be made of a plastic material that is porous and selective to mass transfer, or porous and non-selective, or non-porous and permeable to mass components. For the exchange of heat energy, the tubular wall 36 of each hollow fiber 16 is made of a non-permeable, heat conductive, plastic material adapting the module 10 for use in such applications. For example, the wall 36 can be made of a plastic material that is non-porous and solid, heat energy conductive and has properties that provide a barrier to mass transfer. Preferably, the plastic material of the tubular wall 36 of each hollow fiber 16 for all applications is a highly crystallic thermoplastic polymer.

Figure 12:
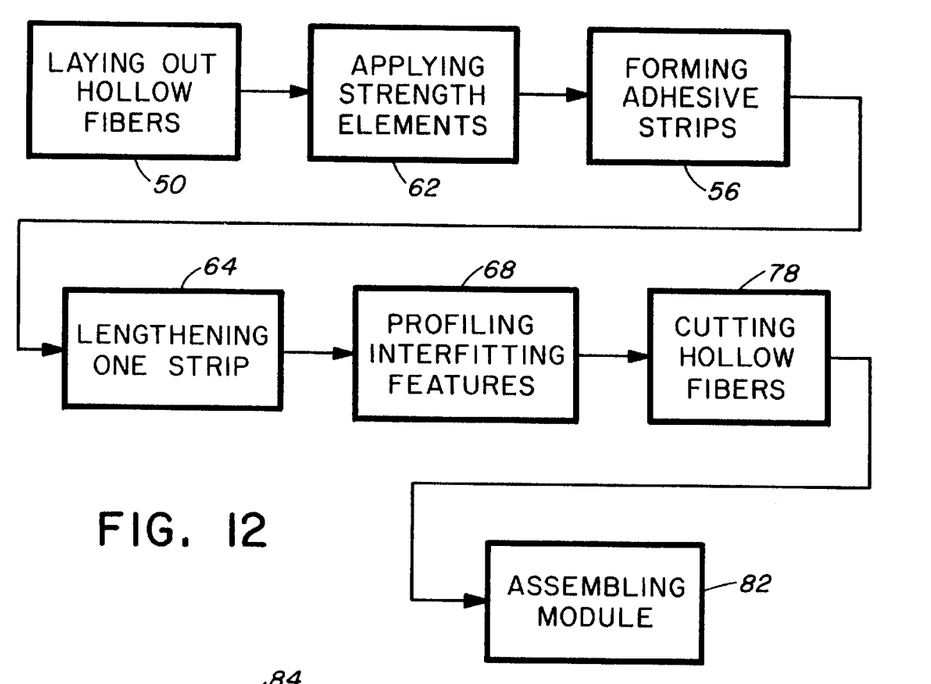
FIG. 12 is a block diagram of the method of manufacturing the concentric radial flow hollow fiber module of the present invention.
Figure 14:
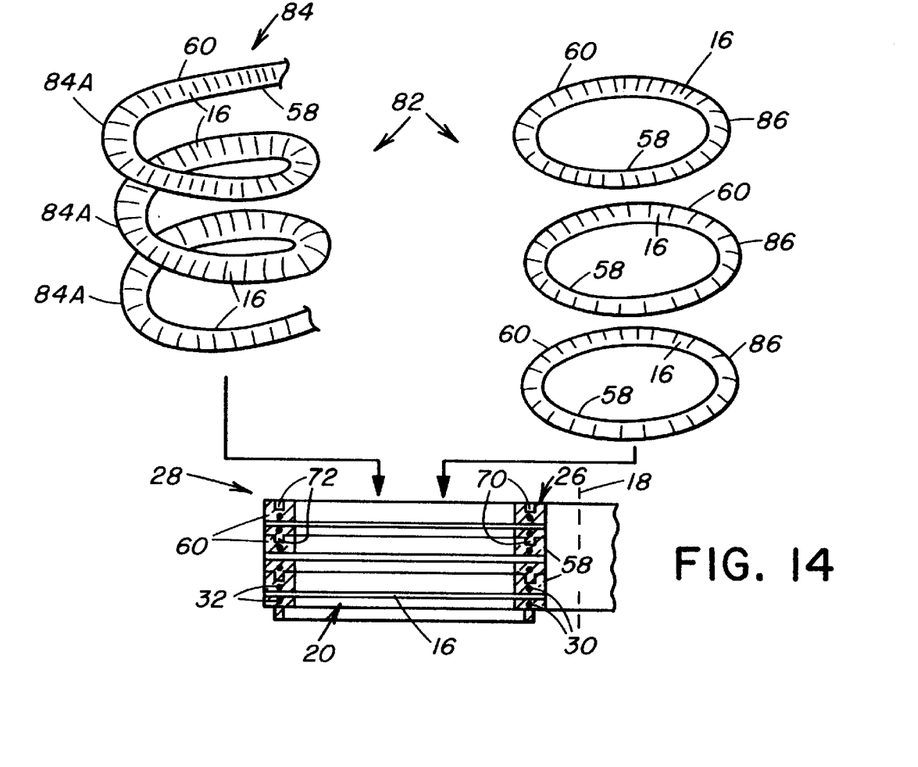
FIG. 14 is a diagrammatic representation of the step of assembling the strips to provide the inner and outer bodies of the module.

Referring now to FIGS. 12 to 14, there is shown, generally and diagrammatically, the steps of the method of manufacture of the concentric radial flow hollow fiber module 10 in accordance with the present invention. As mentioned previously, the method of manufacture of the module 10 can be the same regardless of whether it is provided with properties for use in mass separation and transfer of fluids or provided with properties for use in exchange of heat energy between fluids.

Referring to block 50 of FIG. 12 and to the diagram of FIG. 13, the first basic step of the manufacturing method that is performed is laying out the multiplicity of hollow fibers 16. There are several alternative arrangements of the hollow fibers 16 that can be provided to use in performing the first step of the method. Three of the alternative arrangements are illustrated in FIG. 13. In a first arrangement, the hollow fibers 16 are provided individually or in bunches from a single continuous strand 52 thereof and are laid out in generally side-by-side relationship to one another. Each line in FIG. 13 can be construed to represent either a single hollow fiber 16 or a plurality of hollow fibers bunched together. In a second arrangement, the hollow fibers 16 are provided from a single continuous strand 52 in a plurality of groups 54 being spaced apart from one another so as to define the empty spaces 46 between them. This arrangement will be used to produce a desired one of the five configurations of the module 10 shown in FIGS. 5 to 9. In a third arrangement, the hollow fibers 16 are provided in the textile form 48 in which they overlap and interloop with one another. In the first and second arrangements the main portions 42 of the hollow fibers 16 will take a relatively straight line radial path across the annular-shaped interspace 20, whereas in the third arrangement the main portions 42 of the hollow fibers 16 will take a relatively circuitous radial path, zig-zag or serpentine in configuration, across the interspace 20.

Referring to block 56 of FIG. 12 and to the diagram of FIG. 13, the second basic step of the manufacturing method that is performed is forming a pair of strips 58, 60 of non-permeable adhesive material across the hollow fibers 16 in a spaced relationship from one another so as to encapsulate selected adjacent portions of the hollow fibers 16 aligned in two spaced apart rows. The encapsulated portions of the hollow fibers 16 will become the opposite inner and outer end portions 38, 40 of the tubular walls 36 of the hollow fibers 16 and the portions of the hollow fibers 16 extending between the strips 58, 60 will become the main portions 42 of the tubular walls 36 of the hollow fibers 20. The step of forming the pair of strips 58, 60 also includes providing a selected one strip 60 with segments 60A of a thickness greater than that of the other strip 58 so that in a later step of the method these segments 60A can be reduced in thickness in order to lengthen this one strip 60 relative to the other strip 58 to produce the annular configurations of the strips 58, 60.

Referring to block 62 of FIG. 12 and to the diagram of FIG. 13, an optional, but preferred, step of the manufacturing method that is performed is applying elongated strengthening elements 30, 32 across the selected adjacent portions of the hollow fibers 16 in spaced relationship with one another prior to forming the pair of strips 58, 60 of non-permeable adhesive material thereon. The strengthening elements 30, 32 will thereby be encapsulated by the strips 58, 60 along with the selected adjacent portions of the hollow fibers 16. The strengthening elements 30, 32 are applied across the selected adjacent portions of the hollow fibers 16 by interweaving the strengthening elements between bunches of the hollow fibers 16.

Referring to block 64 of FIG. 12 and to the diagram of FIG. 13, the third basic step of the manufacturing method that is performed is lengthening at least one of the strips 60 relative to the other strip 58 to provide the strips with different lengths. One exemplary way in which lengthening of the one strip 60 relative to the other strip 58 is brought about is by using rollers 66 to squeeze the thickened segments 60A while the adhesive material is in a plastic state (before drying to a hardened state) to permanently reduce the thickness of the one strip 60 and cause elongation thereof relative to the other strip 58. In view that the two strips 58, 60 are interconnected by hollow fibers 16 that maintain the distance between the two strips 58, 60 relatively constant, the elongation or lengthening of the one strip 60 relative to the other strip 58 transforms the pair of initially straight strips 58, 60 into a pair of annular-shaped spaced apart inner and outer strips 58, 60 capable of surrounding the central longitudinal axis 18 (shown in FIGS. 5 to 9) in a concentric spaced apart relationship with one another and with the hollow fibers 16 extending between and interconnecting the inner and outer strips.

Referring to block 68 of FIG. 12 and to the diagram of FIG. 13, an optional, but preferred, step of the manufacturing method that is performed is profiling the strips 58, 60 to form complementary interfitting features 70, 72, such as tongue and groove elements, on opposite sides of each of the strips 58, 60 so that corresponding ones of the strips 58, 60 can be seated and attached to itself in assembling the inner and outer bodies 12, 14 of the module 10, as shown in FIG. 14. Like the lengthening step, one exemplary way in which profiling of the strips 58, 60 is brought about is by using pairs of rollers 74, 76 to reshape the cross-section of the material of the strips 58, 60 while in a plastic state (before cured to a hardened state) so as to define the complementary interfitting features 70, 72 therein.

Referring to block 78 of FIG. 12 and to the diagram of FIG. 13, the fourth basic step of the manufacturing method that is performed is cutting selected portions of the hollow fibers 16 so as to open the hollow fibers 16 to communication at least to the outside of the outer strip 60 or to the inside of the inner strip 58 or both. Suitable severing knifes or blades 80 can be employed to cut the inner and outer excess portions 16A, 16B of the hollow fibers 16 extending beyond the strips 58, 60. Preferably, such cutting is performed by trimming off edge portions of the strips 58, 60 with the excess portions of the hollow fibers 16.

Referring to block 82 of FIG. 12 and to the diagram of FIG. 13, the fifth basic step of the manufacturing method that is performed is assembling the module 10 from the transformed concentric inner and outer strips 58, 60 having the hollow fibers 16 extending between them. The assembling step is preferably performed by first guiding the transformed concentric inner and outer spaced strips 58, 60 into a helical configuration 84 which has successive windings 84A, and then stacking the successive windings of the respective strips 58, 60 upon one another such that they encircle the central longitudinal axis 18 and seat upon one another with the interfitting features 70, 72 formed on the opposite sides of the strips mated together (and also sealably attached together if desired) to form the annular-shaped spaced apart annular walls 26, 28 of the inner and outer bodies 12, 14 defining the annular interspace 18 with the hollow fibers 16 extending thereacross between and connected with the annular walls. The strengthening elements 30, 32 extend longitudinally through the respective strip 58, 60 and thus also circumferentially within the annular walls 26, 28. Alternatively, the assembling can be performed by first forming the transformed concentric inner and outer strips 58, 60 into a plurality of rings 86, and then by stacking the rings 86 upon one another such that they encircle the central longitudinal axis 18 and seat upon (and if desired are sealably attached to) one another at the interfitting features 70, 72 formed on the opposite sides of the strips 58, 60 to form the annular walls 26, 28 of the respective inner and outer bodies 12, 14.

Industrial Applicability

The concentric radial flow hollow fiber module 10 of the present invention can used in numerous industrial applications, some with and others without mass transfer through the walls 36 of the hollow fibers 16. Some representative industrial applications include chemical, pharmaceutical, metal plating, and microelectronics processes. Additional industrial applications include cooling and heating seawater, water desalination, air conditioning, flue gas treatment, mist eliminators, condensing of vapors, cooling towers, and liquid-liquid membrane extractors.

The broad application of the concentric radial flow hollow fiber module 10 of the present invention to many potential industrial applications as a heat energy exchanger is facilitated by the ability to provide such heat exchanger with extremely large heat exchanging surface area without restriction of hydraulic resistance connected with flows of heat exchanging fluids through the hollow fibers. In addition, very thin wall thickness of the hollow fibers (up to two orders in value in comparison with current commercial metal heat exchanging devices) provides the opportunity for building effective heat exchanging systems from non-expensive and corrosion resistant plastics which provide high barrier properties to mass transfer.

Table 1 is a comparison of the design and process parameters of one commercial prior art plastic tube heat exchanger device by Serendip with the present design of the concentric radial flow hollow fiber module 10 as a heat energy exchanger.

TABLE 1

| Parameter | Serendip Design | Present Design |
|---|---|---|
| density of surface area for heat transfer | 400–500 $m^2/m$ | 500–5000 $m^2/m$ |
| effective heat transfer coefficient | 800–900 $W/m^2K$ | >3000 $W/m^2K$ |
| wall thickness | >or = 0.15 mm | 0.025–0.15 mm |
| outside diameter | >or = 2.0 mm | 0.02–0.2 mm |
| length | 0.23–2.6 m | 0.025–0.25 m |
| resistance to corrosive environment | high | high |
| possibility for surface modification to improve durability in harsh environment | choice of material | choice of material; surface treatment |
| construction material | PVDF | PP, PE, PVDF, PET PMP; other highly crystallic thermoplastic polymers |

Plastic materials, especially some thermoplastics, are non-expensive, corrosion resistant and easy for mass processing. Many plastics (HDPE, TPX) can work long periods at ambient temperatures (up to 120° C.) and are resistant to thermal and mechanical shocks. Some plastics, like PEEK, although more expensive, can cover the whole range (outside direct contact with hot flue gases and flame) of temperatures and pressures employed in desalination plants which employ metal heat exchangers.

While it is recognized that plastics are materials of relatively low heat conductivity when compared to metals (for example, thermal conductivity of HDPE is 0.51 $J/m^2K$ while for corrosion resistant cuprous alloys the conductivity value is 100 $J/m^2K$), it also must be recognized that the overall heat transfer rate through the wall of a heat exchanger is material conductivity divided by wall thickness. Typical values of wall thickness of metal heat exchanging tubes for water evaporation—condensation processes are around 1 mm. By comparison, the wall thickness of heat exchanging plastic hollow fibers, such as used in the module 10, are in the range of 0.025 to 0.15 mm. This greatly reduced wall thickness of plastic hollow fibers compared to metal capillaries compensates for the advantages of high heat conductance of metal materials over plastics.

In addition, the hollow fiber geometry of the module 10 permits extremely high packing density of the heat exchanging surface area in the plastic heat exchanger over that of the metal heat exchanger (up to 5000 square meters in 1 cubic meter of heat exchanging installation in hollow fiber constructions versus not more than 500 square meters per cubic meter in the classical metal tube designs).

Finally, the selected plastics used in the module 10 are relatively non-expensive construction materials with low density (on the level of 840 kg/Nm$^3$) in comparision with metals (6000–8000 kg/Nm$^3$). With much lower material consumption in construction of plastic heat exchangers, the hollow fiber heat exchanging design opens the opportunities of radical decrease of the weight, volume and total costs of the heat exchanging equipment made from plastic when compared with those built from metals, assuming the same or better process performances are provided with those built with plastics.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A method of manufacturing a concentric radial flow hollow fiber module, comprising the steps of:
   (a) laying out a multiplicity of hollow fibers;
   (b) forming a pair of strips of non-permeable adhesive material across the hollow fibers in a spaced relationship from one another so as to encapsulate selected adjacent portions of the hollow fibers and such that the hollow fibers generally extend at least between said spaced pair of strips;
   (c) lengthening at least one of said strips relative to the other to thereby transform said strips into a pair of annular-shaped spaced apart inner and outer strips capable of surrounding a central longitudinal axis in a concentric relationship to one another with said hollow fibers extending between and interconnecting said inner and outer strips;
   (d) cutting selected portions of said hollow fibers adjacent to said spaced inner and outer strips so as to open said hollow fibers to communication with at least one of an outside of said outer strip and inside of said inner strip; and
   (e) assembling a module from the spaced inner and outer strips with the hollow fibers extending between and interconnecting the inner outer strips.

2. The method of claim 1 wherein said forming of said pair of strips includes providing said one strip with a thickness greater than that of said other strip.

3. The method of claim 2 wherein said lengthening of said one strip includes reducing said thickness of said one strip to cause elongation thereof relative to said other strip.

4. The method of claim 1 wherein said multiplicity of hollow fibers are laid out from a single continuous thread of said hollow fiber.

5. The method of claim 1 wherein said multiplicity of hollow fibers are laid out in bunches in which individual hollow fibers are disposed in generally side-by-side relationship to one another and in which said bunches of hollow fibers are also disposed in generally side-by-side relationship to one another.

6. The method of claim 1 wherein said multiplicity of hollow fibers are laid out in a textile form in which said hollow fibers overlap and interloop with one another as they extend between said inner and outer strips.

7. The method of claim 1 further comprising:
   applying a pair of elongated strengthening elements across said selected adjacent portions of said hollow fibers in a transverse relationship thereto and in a spaced relationship from one another prior to forming said pair of strips of non-permeable adhesive material to thereby encapsulate the strengthening elements with the selected adjacent portions of the hollow fibers.

8. The method of claim 7 wherein said elongated strengthening elements are applied across said selected adjacent portions of said hollow fibers by interweaving the strengthening elements between bunches of said hollow fibers.

9. The method of claim 1 further comprising:
   profiling said strips by forming complementary interfitting features on opposite sides thereof so that the corresponding ones of said strips can be attached to itself in forming the concentric radial flow hollow fiber module.

10. The method of claim 9 wherein said assembling the module includes:
    guiding the transformed concentric inner and outer spaced strips into a helical configuration having successive windings; and
    stacking the successive windings such that they encircle the central longitudinal axis and seat upon one another at the interfitting features formed on the opposite sides of the strips to form inner and outer bodies defining an annular-shaped interspace with the plurality of hollow fibers extending across the annular interspace between the inner and outer bodies.

11. The method of claim 9 wherein said assembling the module includes:
    forming the transformed concentric inner and outer spaced strips into a plurality of rings; and
    stacking the rings such that they encircle the central axis and seat upon one another at the interfitting features formed on the opposite sides of the strips to form inner and outer bodies defining an annular-shaped interspace with the plurality of hollow fibers extending across the annular interspace between the inner and outer bodies.

* * * * *